Sept. 24, 1968      G. DE COYE DE CASTELET     3,402,602
HYDROPNEUMATIC APPARATUS FOR MEASURING VOLUME VARIATIONS
OF A CAVITY FROM A STANDARD Filed June 28, 1965                                        2 Sheets-Sheet 1

Inventor
Gaetan DeCoye DeCastelet

Stevens, Davis, Miller & Mosher
Attorneys

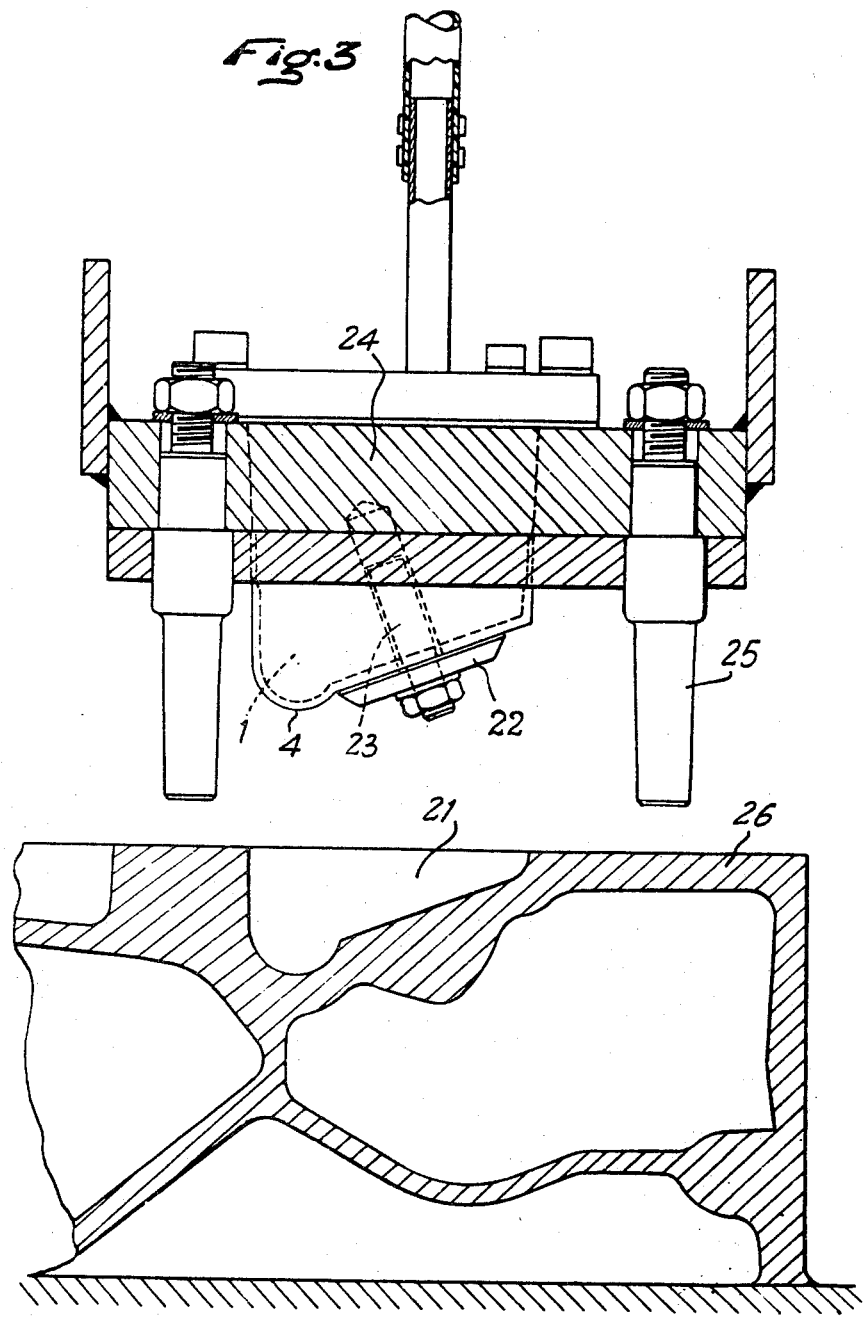

# United States Patent Office 3,402,602
Patented Sept. 24, 1968

3,402,602
HYDROPNEUMATIC APPARATUS FOR MEASURING VOLUME VARIATIONS OF A CAVITY FROM A STANDARD
Gaetan de Coye de Castelet, Billancourt, Hauts-de-Seine, France, assignor to Regie Nationale des Usines Renault, Billancourt, France
Filed June 28, 1965, Ser. No. 467,274
Claims priority, application France, Aug. 19, 1964, 985,592
2 Claims. (Cl. 73—149)

ABSTRACT OF THE DISCLOSURE

A hydropneumatic apparatus for measuring volume variations of a cavity relative to a standard includes a mass having a flexible membrane mounted thereon. The mass and membrane are introduced into the cavity to be measured and the membrane is inflated by pressurized fluid to substantially fill said cavity. The fluid required to fully inflate the membrane is measured to determine the exact volume of the cavity.

---

Figure 1:
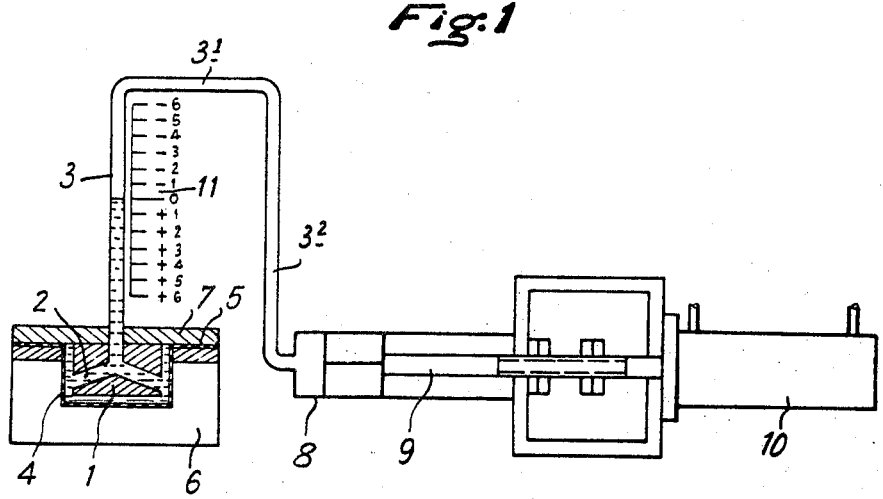

This invention relates to a hydropneumatic apparatus for measuring volumes.

To determine the volumetric capacity of a cavity having a complicated shape it is not always possible to apply a measurement and calculus method and it is current practice to fill this cavity with liquid the volume of which is subsequently measured.

However, this method is attended by a number of inconveniences. Thus

It is necessary to seal hermetically all the openings of the cavity, under the same conditions as they are to be sealed under normal service conditions;

When during the measurement the operator becomes aware that these seals are not fluid-tight, the measurement must be made again after having waited until the cavity has dried up, for the liquid film adhering to the walls thereof may often represent an appreciable volume in proportion to the volume of said cavity, and Obviously the handling of liquid constitutes by itself a number of difficulties, such as the above-mentioned leaks.

The apparatus constituting the subject-matter of the present invention makes it possible to measure the volume of a cavity of complicated shape without having to overcome any of the above-listed inconveniences.

This apparatus is in the form of a mass of metal or other material of which the external contour corresponds, in shape, except for a gap of the order of a few millimeters, to all portions of said cavity which are not undercut, to the inner contour of the cavity, the volume of which is to be measured. The mass is adapted to bear on the planar joint between the mass and the cavity and towards which the cavity opens. Surrounding this mass is an elastic membrane assembled in a fluid-tight manner with said mass in the joint. Thus, it is only necessary to introduce between said mass and said membrane a volume of liquid sufficient to fill the cavity for measuring its volume by comparison with a reference or control cavity.

If necessary, the membrane is stiffened in those regions where it is applied against apertures opening into the cavity and to this end the membrane may have fixed thereon metal or other inserts having the same shape and volume as the parts to be fitted or mounted in these apertures under actual service conditions.

The liquid is introduced between said inner mass and the membrane under a certain pressure by using to this end any known and suitable means whereby the membrane will take the exact shape or contour of the inner cavity. On the other hand it is particularly desirable although not compulsory to have the possibility of creating a certain vacuum between said mass and the membrane so that the membrane will adhere to said mass during the introduction of the assembly into the cavity, to avoid damaging the membrane during this operation.

The measuring apparatus according to this invention may be used for example but not exclusively for measuring the volumetric capacity of combustion chambers of internal combustion engines.

The liquid may be subjected to a pressure or alternatively to a vacuum by means of any suitable device such as a pump-and-cylinder unit, or a double reservoir.

In order to afford a clearer understanding of this invention and of the manner in which the same may be carried out in practice, reference will now be made to the attached drawings illustrating diagrammatically by way of example two typical forms of embodiment of the apparatus of this invention.

Figure 2:
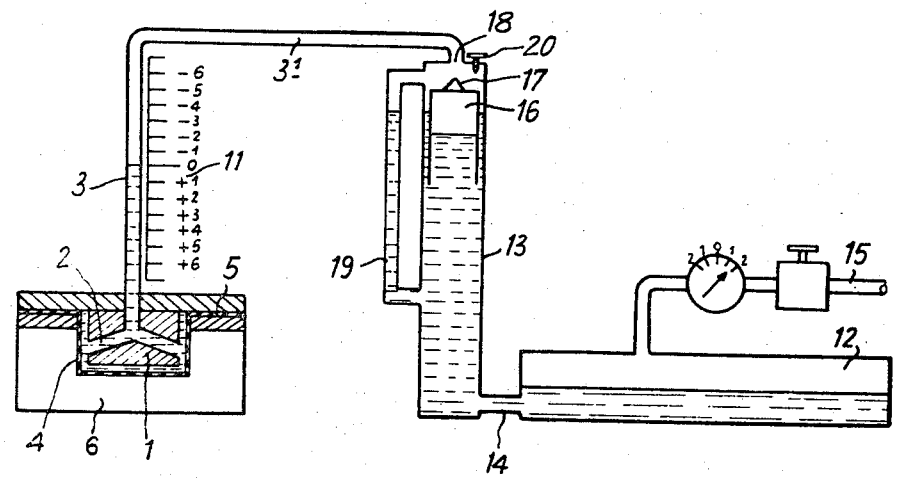

In the drawings:

FIGURE 1 is a diagrammatic elevation showing the measuring apparatus of this invention associated with pump-and-cylinder unit for creating a fluid pressure;

FIGURE 2 is a modified form of embodiment of the apparatus shown in FIGURE 1, the pressure being created by using a two-reservoir system, and FIGURE 3 is a vertical section taken through the cylinder-head of an internal combustion engine and through the apparatus, showing a typical application of the method of this invention for measuring the volumetric capacity of the combustion chamber of an engine.

Referring first to FIGURE 1, it will be seen that the apparatus according to this invention comprises a solid mass 1 of metal or other material which is formed with ducts 2 opening to the outer surface thereof and communicating with a gauge tube 3. This mass 1 is surrounded by an elastic membrane 4 of rubber or like material shown in thick dash lines. The outer contour of the mass and membrane are preferably 1 or 2 mm. smaller than the inner contour of the cavity to be measured. The edges 5 of this membrane 4 are clamped between the member 6 containing the cavity or chamber to be measured, and in which the mass and membrane assembly is introduced, and the joint plate 7 covering the member 6. The tube 3 has extensions $3^1$, $3^2$, the latter being in communication with the cylinder 8 of a fluid pressure source means including an air pump and cylinder unit 9, 10 disposed in axial alignment with extension $3^2$. The tube 3, the ducts 2 and the space left between the mass 1 and the elastic membrane 4 are filled with colored water of which the level in the tube 3, by moving with respect to a scale 11, will provide the desired data concerning the measurement of the volumetric capacity of the chamber formed in member 6.

By actuating the cylinder 10 and pump 9 pressurized fluid from this pump is delivered into the tube sections $3^1$, $3^2$ and 3 above the level of the column of colored liquid in the tube 3, this liquid under pressure acting upon the elastic membrane 4 to press it against the walls of the chamber in member 6. When the membrane has been properly pressed against the walls of this cavity the level of the colored liquid will be stabilized in tube 3 and the scale will provide a precise indication as to the volume of said cavity.

The volume of liquid in the membrane is constant and under these conditions if the volume of the chamber to be measured decreases or increases from a standard, the liquid level in the tube 3 will vary proportionally: thus, by using a graduated slide the volumetric variation can be read directly.

Before using the apparatus for actual measurements the same must be gauged, and to this end the mass-and-membrane assembly 1, 4 is placed in a reference member and the membrane subjected to a certain pressure, for example 30 p.s.i., by actuating the pump-and-cylinder assembly. By using the movable graduated slide 11 the zero line thereof will be aligned with the level of colored liquid in the tube 3.

During the filling or during the operation of the apparatus, adequate means for adjusting the pump and cylinder are operated for regulating the pressure or the vacuum in the plus or minus direction.

It is desirable in the inoperative position of the membrane to create a vacuum by means of the pump in order to apply this membrane against the mass 1 to facilitate its introduction into the chamber to be measured while avoiding any damage to the membrane.

According to the specific applications contemplated, a plurality of membrane apparatus may be coupled or connected to a common pump-and-cylinder assembly.

In the alternate form of embodiment illustrated in FIGURE 2 the same arrangement is reproduced, as far as the mounting of the solid mass 1 and the membrane 4 in the chamber of the member 6 with the tube sections 3 and 3¹ is concerned. However, two reservoirs are substituted for the pump and cylinder assembly, that is, a primary reservoir 12 and a secondary or auxiliary reservoir 13 interconnected by a duct 14 and filled with liquid. The primary reservoir 12 receives compressed air through the pipe line 15, and the auxiliary reservoir 13 connected to the tube 3¹ comprises a float 16 carrying on its top a valve member 17 adapted to engage and close the seat 18 controlling the inlet to said tube section 3¹ to prevent any flow of liquid into this tube section 3¹ when the liquid level rises in the auxiliary reservoir. A liquid-level gauge tube 19 is associated with the secondary reservoir 13 and a needle valve 20 is screwed in the top wall of this reservoir 13 to permit the controlled escape of air from the upper portion of this reservoir.

As in the preceding case, the liquid contained in the elastic membrane is pressurized and causes this membrane to adhere strongly to the walls of the chamber to be measured.

The volume of liquid contained in the membrane is constant; therefore, if the volume of the chamber to be measured decreases or increases from a standard, the liquid level in the tube will vary in proportion; thus, by using the graduated slide, this volume variation can be read directly on the apparatus.

To gauge the apparatus the mass and membrane assembly is placed in a reference member and a certain pressure, for example of the order of 30 p.s.i., is applied to the membrane by means of the two reservoirs 12, 13. The adjustment, during the filling and during the operation of the apparatus, and assuming that the latter is in its measuring position, is effected by creating an air leak in the secondary reservoir 13 by opening the needle valve 20. To lower the level with the apparatus in its inoperative condition the needle valve 20 is operated for introducing air into the upper portion of reservoir 13.

FIGURE 3 illustrates the application, given by way of example, of the hydropneumatic apparatus according to this invention to the measurement of the volumetric capacity of the combustion chamber of an internal combustion engine. In this case, the metal mass or like solid body 1 roughly corresponding in shape to the combustion chamber 21 is also used. The elastic membrane is shown at 4. The member 22 is a metal part corresponding in shape and volume to the engine valves; this part is mounted on a guide stud 23 and carried by the membrane, the stud 23 being adapted to slide in the metal mass. The assembly consisting of the metal mass 1 and membrane 4 is mounted on the support 24 provided with centering studs 25 in the cylinder head for positioning same on the cylinder head 26 in which the combustion chamber 21 is formed.

Finally, this apparatus may be used for automatically controlling the tolerances of the volumes of cavities formed in mass-produced parts or, if desired, for classifying these parts in various groups according to these volumetric variations.

This adaptation may for example be obtained by disposing electrodes in the tube 3, the ends of these electrodes being spaced at different levels and utilized for closing through the liquid in the tube various electrical circuits of which the currents will be suitably amplified for actuating signals or relays as described in the French Patent No. 1,039,015 filed on June 25, 1951.

It is obvious that it would not constitute a departure from this invention to replace these electrodes with any other equivalent means for detecting the liquid level, for example floats, photocell or any member responsive to variations in the electrical resistance, field or capacity, which may be produced by the displacement of the liquid in the tube.

I claim:

1. A hydropneumatic apparatus for measuring volumes comprising a mass surrounded by a substantially closely fitting elastic membrane, means for creating a vacuum between said mass and said membrane to cause the latter to closely engage said mass, said mass and membrane being adapted to be introduced into a cavity the volume of which is to be measured, means for introducing a measurable volume of pressurized liquid between said mass and said elastic membrane causing the latter to expand to contact the inner wall of said cavity so that the outer contour of said membrane approaches as much as possible the inner contour of said cavity, means to compare the measurable volume of liquid used with the volume of liquid necessary for measuring a reference cavity with the same mass thereby indicating the volume to be determined.

2. A hydropneumatic apparatus for measuring volumes, comprising a mass surrounded by an elastic membrane, said mass and membrane being adapted to be introduced into a cavity the volume of which is to be measured, stiffening means attached to said membrane at those regions which engage apertures opening into said cavity, and insert means having the same shape and volume as the parts which in actual service are mounted in said regions, means for introducing between said membrane and said central mass a measured volume of pressurized liquid causing said membrane to be brought into contact with the inner wall of said cavity whereby a comparison between the volume of liquid necessary for measuring a reference cavity with the same mass and said measured volume of pressurized liquid will indicate the volume to be determined.

References Cited

UNITED STATES PATENTS

| 2,270,505 | 1/1942 | Burleson | 73—149 |
| 2,341,138 | 2/1944 | Davis | 73—149 |
| 3,132,541 | 5/1964 | Mothlet | 77—32.8 X |
| 2,682,026 | 6/1954 | Mesh et al. | |

S. CLEMENT SWISHER, *Acting Primary Examiner.*

JEFFREY NOLTON, *Assistant Examiner.*